(12) United States Patent
Sakaguchi (10) Patent No.: US 7,312,834 B2
(45) Date of Patent: Dec. 25, 2007

(54) IMAGE PROCESSOR, SEMICONDUCTOR INTEGRATED CIRCUIT, AND METHOD FOR PROCESSING AN IMAGE

(75) Inventor: Takashi Sakaguchi, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 535 days.

(21) Appl. No.: 11/016,830

(22) Filed: Dec. 21, 2004

(65) Prior Publication Data

US 2005/0162564 A1 Jul. 28, 2005

(30) Foreign Application Priority Data

Dec. 26, 2003 (JP) ............................. 2003-435000

(51) Int. Cl.
*H04N 5/57* (2006.01)
(52) U.S. Cl. ..................................... 348/687
(58) Field of Classification Search ................ 348/687, 348/688, 674, 678, 679, 625, 606, 631
See application file for complete search history.

(56) References Cited

U.S. PATENT DOCUMENTS

| 4,680,624 A | * | 7/1987 | Murakami | ................... 348/256 |
| 5,223,927 A | * | 6/1993 | Kageyama et al. | ......... 348/180 |
| 5,257,108 A | * | 10/1993 | Muraoka | ..................... 348/674 |
| 6,072,526 A | * | 6/2000 | Hashimoto et al. | ...... 348/223.1 |
| 6,611,296 B1 | * | 8/2003 | Nieuwenhuizen et al. | .. 348/625 |
| 2005/0057486 A1 | * | 3/2005 | Aoki et al. | ................. 345/102 |

FOREIGN PATENT DOCUMENTS

JP 6-189158 7/1994

OTHER PUBLICATIONS

U.S. Appl. No. 11/237,858, filed Sep. 29, 2005, Yamagishi et al.

* cited by examiner

*Primary Examiner*—Paulos Natnael
(74) *Attorney, Agent, or Firm*—Oblon, Spivak, McClelland, Maier & Neustadt, P.C.

(57) ABSTRACT

An image processor includes a luminance signal processor configured to execute an amplification by utilizing a gain set by a plurality of gain step-sizes including a first gain step-size and a second gain step-size less than the first gain step-size, to an image signal component which is equal to or less than a fixed luminance level in an image signal. The control circuit is configured to control increase and decrease of the gain utilized by the amplification and the gain step-sizes based on a ratio that a luminance level of the image signal component is equal to or less than the reference detection level, a ratio that the luminance level of the image signal component is equal to or less than a first detection level greater than the reference detection level, and a ratio that luminance level of the image signal component is equal to or less than a second detection level less than the reference detection level.

20 Claims, 11 Drawing Sheets

IMAGE PROCESSOR, SEMICONDUCTOR INTEGRATED CIRCUIT, AND METHOD FOR PROCESSING AN IMAGE

CROSS REFERENCE TO RELATED APPLICATIONS AND INCORPORATION BY REFERENCE

This application is based upon and claims the benefit of priority from the prior Japanese Patent Applications No. P2003-435000, filed on Dec. 26, 2003; the entire contents of which are incorporated herein by reference.

BACKGROUND OF THE INVENTION

1. Field of the Invention

The present invention relates to an image processor, a semiconductor integrated circuit, and a method for processing an image, capable of executing black stretching by a digital system.

2. Description of the Related Art

A video signal for displaying an image on a display includes a luminance signal, a color signal, and a synchronizing signal. An image processor such as a television set has a black stretching circuit for improving the contrast of the image and for emphasizing black color. The "black stretching" refers to an operation of amplifying the level of the luminance signal equal to or less than a fixed luminance level (start point) toward the black side of the luminance level. The black stretching circuit is arranged as a feed back circuit, and includes a black stretching amplifier for generating a black stretched signal from the luminance signal. The black stretched signal is compare with a reference detection level. A signal component in the black stretched signal equal to or less than the reference detection level is detected as a black level. The gain of the black stretching amplifier is controlled so that a ratio of a black level component to an image in a fixed period corresponds to a setting ratio.

With the progress of digital technology, the black stretching circuit has been digitized. Since the analog circuit can control the gain continuously, a black stretching amplifier arranged as the analog circuit can achieve fine characteristic by use of feed back technology. However, the gain of a black stretching amplifier arranged as a digital circuit is discrete. Therefore, the gain of the black stretching amplifier is controlled by use of a gain step-size. The "gain step-size" refers to a value obtained by dividing the maximum gain of the black stretching amplifier by a fixed value. When the black stretching is executed by a digital system, a ratio of the black level to an image in a display (hereinafter referred to as "black color ratio") is detected, and the gain of the black stretching amplifier is controlled based on the detected black color ratio.

With respect to the black stretching amplifier arranged as a digital circuit, the gain is controlled so that the black color ratio can reach to the setting ratio. When the gain is suddenly changed into the fixed gain, the change become clear to the human eye. Then, the step-size of the gain change is so selected such that the change of the image does not become noticeable. When the step-size of the gain change is too small, the time for increasing the black color ratio up to the setting ratio increases.

When an image level in a display is uniform and little higher than the reference detection level, i.e., the entire display is a black color near the reference detection level, the black color ratio goes to 0%. When the setting ratio is 3%, the black stretching amplifier amplifies the luminance signal toward a black level, and increases the black color ratio. However, since the image level in the display is uniform, the black color ratio after the amplification goes to 100%. When the black color ratio goes to 100%, the black stretching amplifier suppresses the amplification, and decreases the black color ratio. As a result, the black color ratio goes to 0% again. As described above, image flicker occurs in the display because the black stretching amplifier repeatedly increases and decreases the gain. Therefore, the characteristics of the black stretching circuit of a digital system is worse than a black stretching circuit of an analog system because the black stretching circuit of the digital system is not able to control the gain continuously.

SUMMARY OF THE INVENTION

An aspect of the present invention inheres in an image processor encompassing, a luminance signal processor configured to execute an amplification by utilizing a gain set by a plurality of gain step-sizes including a first gain step-size and a second gain step-size less than the first gain step-size, to an image signal component which is equal to or less than a fixed luminance level in an image signal, so that a ratio that a luminance level of the image signal component is equal to or less than a reference detection level can reach a setting ratio, and a control circuit configured to control increase and decrease of the gain utilized by the amplification and the gain step-sizes based on a ratio that a luminance level of the image signal component amplified by the luminance signal processor is equal to or less than the reference detection level, a ratio that the luminance level of the image signal component amplified by the luminance signal processor is equal to or less than a first detection level greater than the reference detection level, and a ratio that luminance level of the image signal component amplified by the luminance signal processor is equal to or less than a second detection level less than the reference detection level.

Another aspect of the present invention inheres in a semiconductor integrated circuit encompassing, a luminance signal processor integrated on a semiconductor chip and configured to execute an amplification by utilizing a gain set by a plurality of gain step-sizes including a first gain step-size and a second gain step-size less than the first gain step-size, to an image signal component which is equal to or less than a fixed luminance level in an image signal, so that a ratio that a luminance level of the image signal component is equal to or less than a reference detection level can reach a setting ratio, and a control circuit integrated on the semiconductor chip and configured to control increase and decrease of the gain utilized by the amplification and the gain step-sizes based on a ratio that a luminance level of the image signal component amplified by the luminance signal processor is equal to or less than the reference detection level, a ratio that the luminance level of the image signal component amplified by the luminance signal processor is equal to or less than a first detection level greater than the reference detection level, and a ratio that luminance level of the image signal component amplified by the luminance signal processor is equal to or less than a second detection level less than the reference detection level.

Still another aspect of the present invention inheres in a method for processing an image encompassing, executing an amplification by utilizing a gain set by a plurality of gain step-sizes including a first gain step-size and a second gain step-size less than the first gain step-size, to an image signal component which is equal to or less than a fixed luminance level in an image signal, so that a ratio that a luminance level of the image signal component is equal to or less than a reference detection level can reach a setting ratio, and controlling increase and decrease of the gain utilized by the amplification and the gain step-sizes based on a ratio that a luminance level of the image signal component amplified by the luminance signal processor is equal to or less than the reference detection level, a ratio that the luminance level of the image signal component amplified by the luminance signal processor is equal to or less than a first detection level greater than the reference detection level, and a ratio that luminance level of the image signal component amplified by the luminance signal processor is equal to or less than a second detection level less than the reference detection level.

DETAILED DESCRIPTION OF THE INVENTION

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details in other instances, well-known circuits have been shown in block diagram form in order not to obscure the present invention with unnecessary detail. In the following description, the words "connect" or "connected" defines a state in which first and second elements are electrically connected to each other without regard to whether or not there is a physical connection between the elements.

Figure 1:
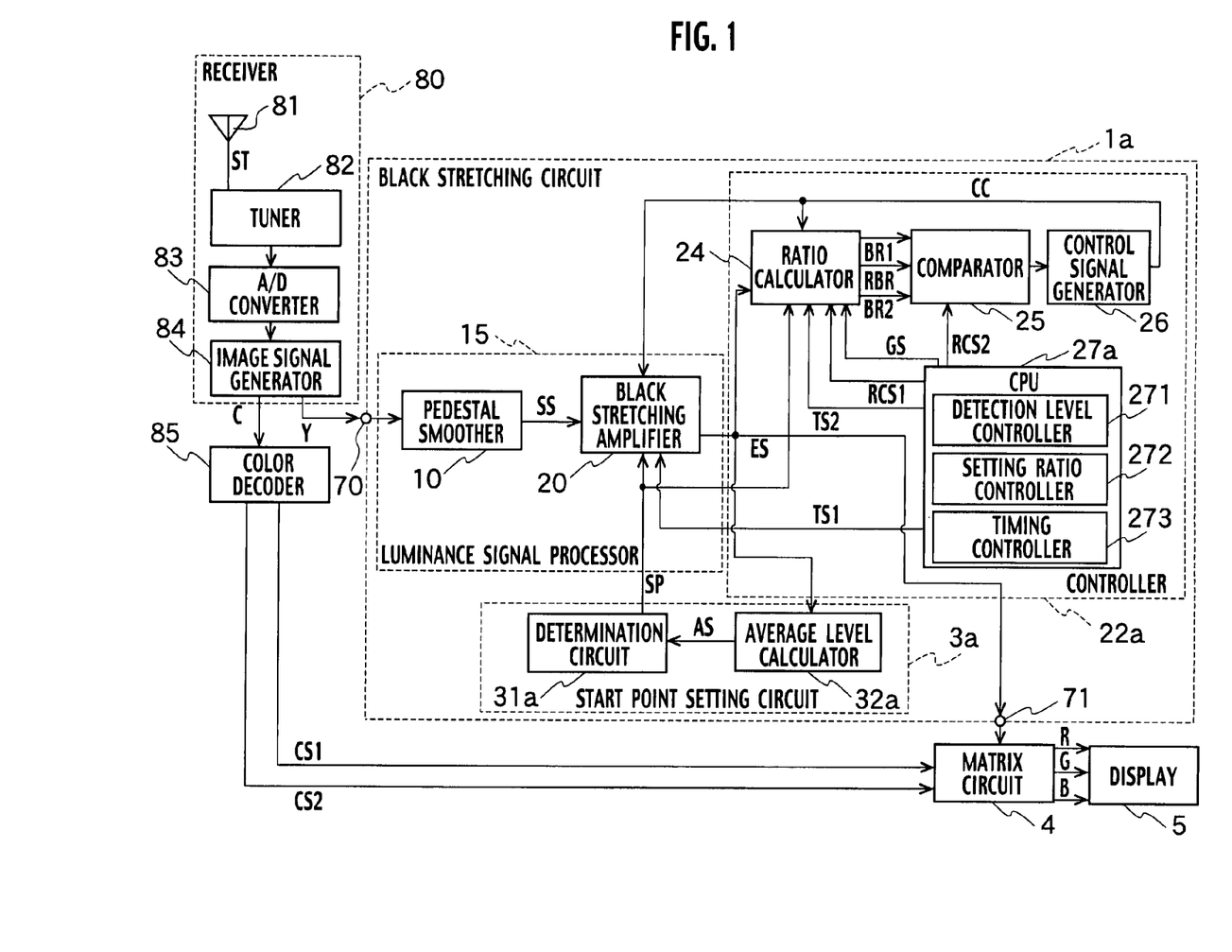
FIG. 1 is a block diagram showing an example of an image processor according to an embodiment of the preset invention.

As shown in FIG. 1, a television set having a receiver 80, a black stretching circuit 1a and a color decoder 85 connected to the receiver 80, a matrix circuit 4 connected to the black stretching circuit 1a and the color decoder 85, and a display 5 connected to the matrix circuit 4 are illustrated as an example of an image processor according to an embodiment of the preset invention.

The black stretching circuit 1a includes a luminance signal processor 15, a start point setting circuit 3a, and a controller 22a. The start point setting circuit 3a sets a luminance level of a black stretching start point in an image signal. The luminance signal processor 15 amplifies an image signal by controlling a luminance level of an image signal equal to or less than a black stretching start level by use of a plurality of gain step-sizes. The controller 22a detects an image signal component in the controlled image signal equal to or less than a plurality of detection levels as a black level, and calculates a ratio of the black level to the controlled image signal at every detection level. The controller 22a compares the calculated ratios with a setting ratio, and controls the amplification in accordance with a result of the comparison.

For example, the luminance signal processor 15 utilizes a first gain step-size, and a second gain step-size less than the first gain step-size as the gain step-sizes. The controller 22a utilizes a reference detection level, a first detection level greater than the reference detection level, and a second reference detection level less than the reference detection level as the detection levels.

The receiver 80 generates a luminance signal Y and a color signal C from a received signal ST. The color decoder 85 converts the color signal C into a first color difference signal CS1 and a second color difference signal CS2. The matrix circuit 4 supplies tri-color signals R, G, and B to the display 5 based on the first color difference signal CS1, the second color difference signal CS2, and a black stretched signal ES. For example, a liquid crystal display (LCD) or a plasma display panel (PDP) is used as the display 5.

The luminance signal processor 15 includes a pedestal smoother 10 connected to a luminance signal input terminal 70, and a black stretching amplifier 20 connected between the pedestal smoother 10 and a black stretched signal output terminal 71. The pedestal smoother 10 removes a synchronizing signal from the luminance signal Y, and generates a smoothed signal SS by fixing the signal level in the blanking period to the pedestal level. The black stretching amplifier 20 executes black stretching to the luminance signal, except for the blanking period, a letterbox period, and side panel period. That is, the black stretching amplifier 20 amplifies the signal component of the luminance signal, which has a luminance level equal to or less than the start point, up to the black level.

The black stretching amplifier 20 is a digital amplifier. Two gain step-sizes are set to the black stretching amplifier 20 based on a control signal CC supplied by the controller 22a. In this case, one of the first gain step-size and the second gain step-size is provided to the black stretching amplifier 20.

The first gain step-size is a value of 1/A of the maximum gain (C times in later description) of the black stretching amplifier 20. For example, 4, 8, or 16 can be used as the value of "A". The second gain step-size is a value of 1/B of the maximum gain of the black stretching amplifier 20. For example, integer multiple of the value of "A" can be used as the value of "B". The maximum gain of the black stretching amplifier 20 is about 3 [dB] for instance.

The start point setting circuit 3a includes an average level calculator 32a connected to an output of the black stretching amplifier 20, and a determination circuit 31a connected between the average level calculator 32a and the black stretching amplifier 20. The average level calculator 32a calculates an average picture level (APL) of the black stretched signal ES, and generates an image control signal AS. The determination circuit 31a determines the start point of the black stretching in accordance with the image control signal AS, and generates a start point signal SP. The start point level is set to about 22 [IRE], i.e., about 157 [mV] in the national television standards committee (NTSC) system.

Furthermore, the controller 22a includes a ratio calculator 24, a comparator 25 connected to the ratio calculator 24, a control signal generator 26 connected to the comparator 25, and a central processing unit (CPU) 27a connected to the ratio calculator 24 and the comparator 25. The ratio calculator 24 calculates a reference ratio, a first ratio, and a second ratio from the black stretched signal ES. The controller 22a selects one of the first and second gain step-sizes based on the reference ratio, the first ratio, and the second ratio.

The CPU 27a includes a detection level controller 271, a setting ratio controller 272, and a timing controller 273. The detection level controller 271 supplies a reference detection level signal RCS1 for detecting a luminance signal component equal to or less than the reference detection level as the black level, and controls the reference detection level. The setting ratio controller 272 supplies a setting ratio signal RCS2 to the comparator 25, and controls the setting ratio. The setting ratio signal RCS2 indicates a ratio of a luminance level of a black signal equal to or less than a fixed detection level.

The timing controller 273 supplies a first timing signal TS1, indicating the blanking period of the luminance signal Y, to the black stretching amplifier 20, and supplies a second timing signal TS2, indicating the image period of the black stretched signal ES, to the ratio calculator 24. The CPU 27a supplies a maximum gain signal GS, indicating the maximum gain of the black stretching amplifier 20, to the ratio calculator 24. The detection level controller 271 sets a reference level of about 3 [IRE], i.e., about 22 [mV], or pedestal level. The setting ratio controller 272 sets the setting ratio to a desired ratio such as 1%, 2%, . . . .

Figure 2:
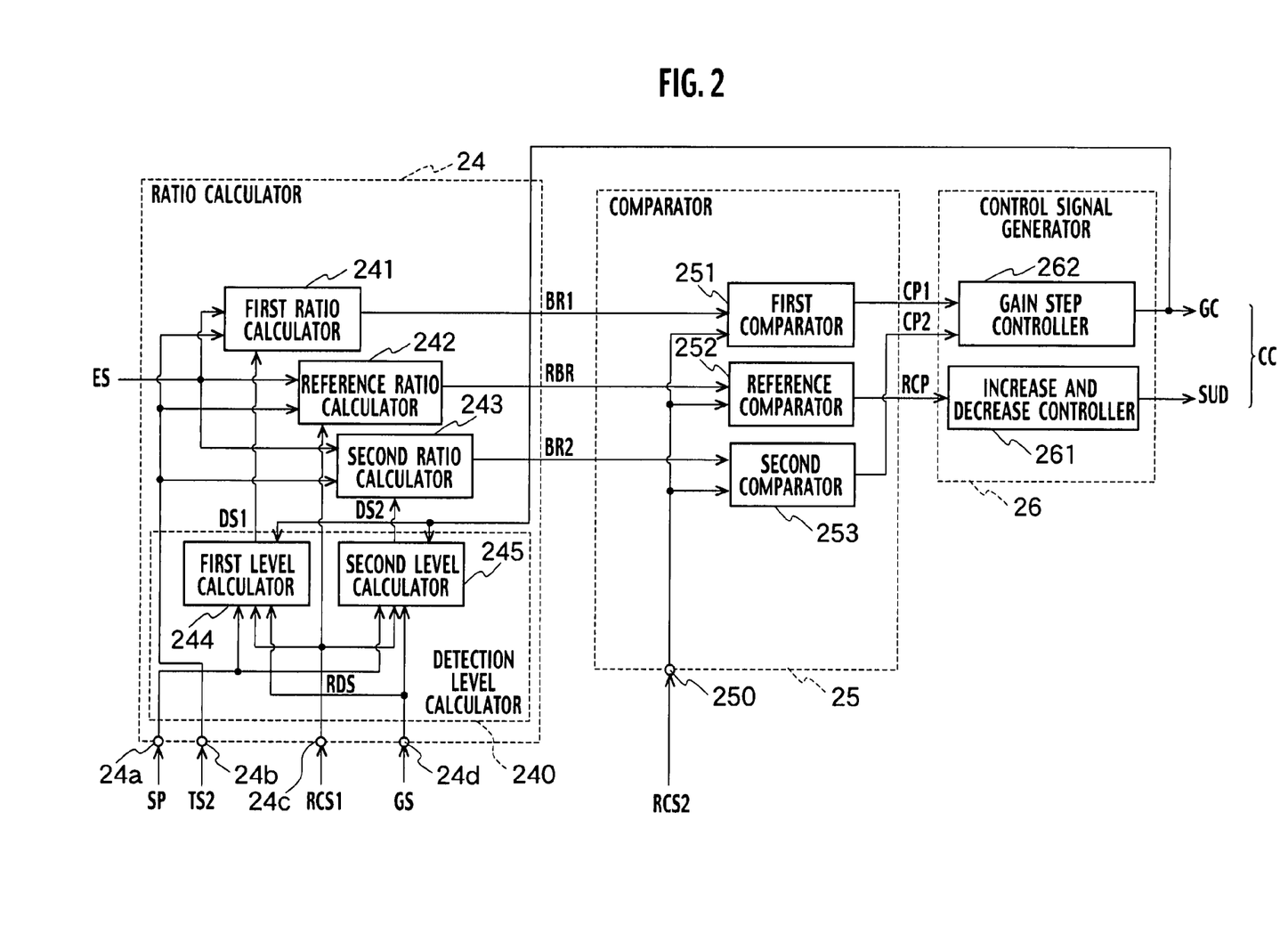
FIG. 2 is a block diagram showing a ratio calculator, a comparator, and a control signal generator according to the embodiment of the preset invention.

As shown in FIG. 2, the ratio calculator 24 includes a start point signal input terminal 24a, a timing signal input terminal 24b, a reference detection level signal input terminal 24c, a maximum gain signal input terminal 24d, a detection level calculator 240, a first ratio calculator 241, a reference ratio calculator 242, and a second ratio calculator 243. The detection level calculator 240 calculates the first detection level and the second detection level based on the reference detection level signal RCS1, the start point signal SP, the maximum gain signal GS, and the gain step-size control signal GC. The detection level calculator 240 generates a first detection level signal DS1 and a second detection level signal DS2.

Furthermore, the first ratio calculator 241 calculates a first ratio indicating a ratio of the luminance level less than the first detection level to the black stretched signal ES, and generates a first ratio signal BR1. The reference ratio calculator 242 calculates a reference ratio indicating a ratio of the luminance level less than the reference detection level to the black stretched signal ES, and generates a reference ratio signal RBR. The second ratio calculator 243 calculates a second ratio indicating a ratio of the luminance level less than the second detection level to the black stretched signal ES, and generates a second ratio signal BR2.

The detection level calculator 240 includes a first level calculator 244 configured to generate the first detection level signal DS1, and a second level calculator 245 configured to generate the second detection level signal DS2.

Figure 3:
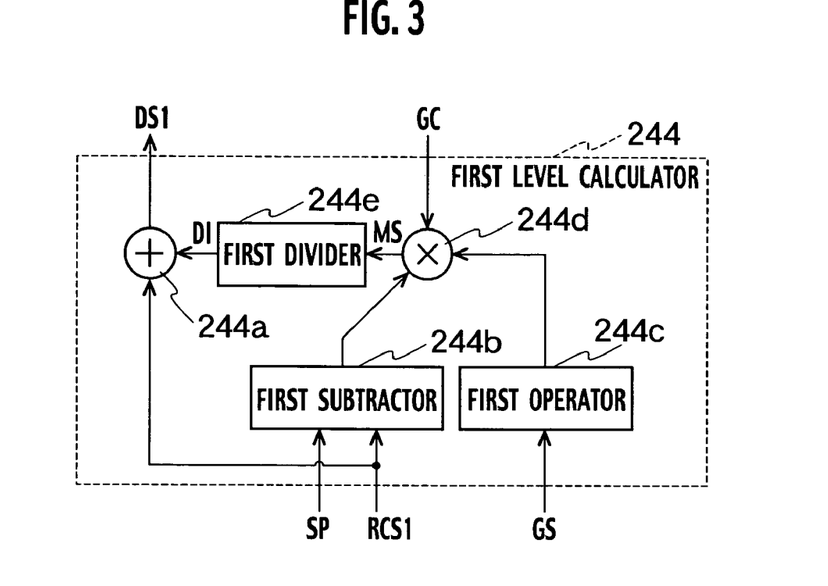
FIG. 3 is a block diagram showing a first level calculator according to the embodiment of the preset invention.

As shown in FIG. 3, the first level calculator 244 includes a first operator 244c, a first subtractor 244b, a first multiplier 244d connected to the first operator 244c and the first subtractor 244, a first divider 244e connected to the first multiplier 244d, and an adder 244a connected to the first divider 244e.

Figure 5:
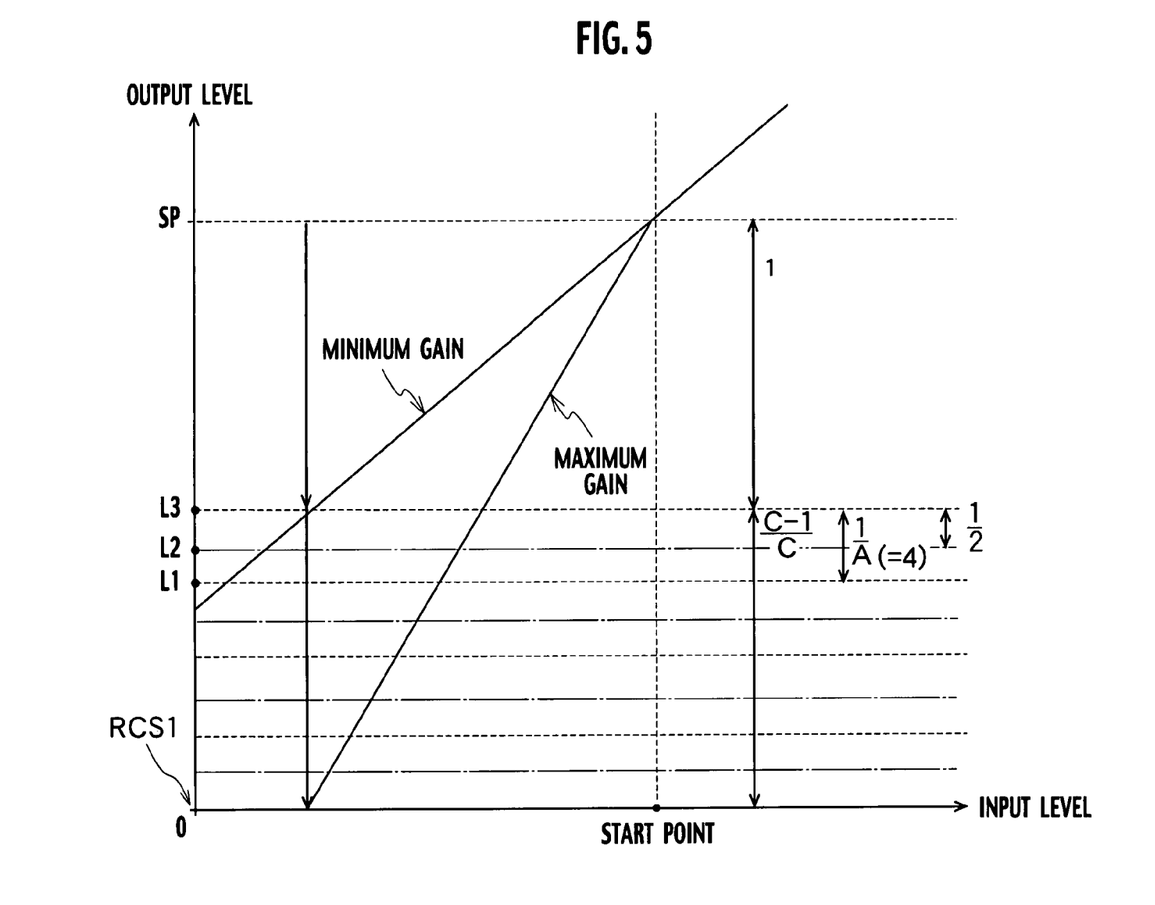
FIG. 5 is a schematic diagram showing an operation of the first level calculator and the second level calculator according to the embodiment of the preset invention.

The first subtractor 244b subtracts the reference detection level from the start point level L3 [IRE] shown in FIG. 5 based on the start point signal SP and the reference detection level signal RCS1. In FIG. 5, the reference detection level is set to 0 [IRE]. When the start point level is "SP" and the reference detection level is "RCS1", the output signal of the first subtractor 244b is represented by (SP-RCS1).

As shown in FIG. 5, the first operator 244c executes an operation of (C−1)/C based on the maximum gain signal GS when the maximum gain (amplification) of the black stretching amplifier 20 is C. When the maximum gain of the black stretching amplifier 20 is 1.5, a result of the operation is ⅓. Or, the output signal of the first operator 244c may be fixed to ⅓. The first multiplier 244d multiplies the output signal of the first subtractor 244b by the output signal of the first operator 244c. Therefore, the output signal MS of the first multiplier 244d is represented by:

$$MS=(SP-RCS1)\times(C-1)/C \quad (1)$$

That is, the output signal of the first multiplier 244d indicates a range of 0 [IRE] to L3 [IRE] shown in FIG. 5.

The gain step-size control signal GC is supplied to the first multiplier 244d. The first multiplier 244d executes multiplication on the first gain step-size only. Or, the first gain step-size may be previously set to the first multiplier 244d. When the output signal of the first multiplier 244d is MS, following equation is established by the equation (1):

$$MS=(SP-RCS1)\times(C-1)/C\times 1/A \quad (2)$$

Therefore, when the value of "A" is 4, the output signal of the first multiplier 244d indicates a range of L1 [IRE] to L3 [IRE] shown in FIG. 5.

The output signal of the first multiplier 244d is supplied to the first divider 244e. As shown in FIG. 5, the first divider 244e divides the output signal of the first multiplier 244d by 2. Therefore, when the output signal of the first divider 244e is "DI", the following equation is established by the equation (2):

$$DI=(SP-RCS1)\times(C-1)/C\times 1/A\times \tfrac{1}{2} \quad (3)$$

That is, the output signal of the first divider 244e indicates a range of L2 [IRE] to L3 [IRE] shown in FIG. 5.

The adder 244a adds the output signal of the first divider 244e to the reference detection level. Therefore, when the first detection level is "DS1", the following equation is established by the equation (3):

$$DS1=RCS1+\{(SP-RCS1)\times(C-1)/C\times 1/A\times \tfrac{1}{2}\} \quad (4)$$

Figure 4:
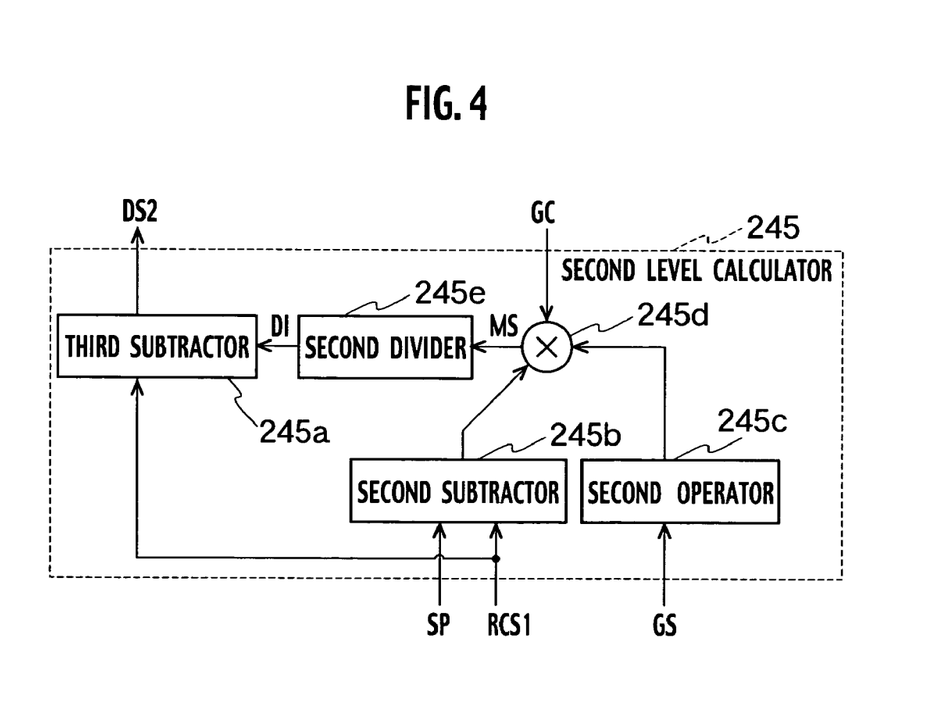
FIG. 4 is a block diagram showing a second level calculator according to the embodiment of the preset invention.

On the other hand, the second level calculator 245 shown in FIG. 4 includes a second operator 245c, a second subtractor 245b, a second multiplier 245d, a second divider 245e, and a third subtractor 245a. The second level calculator 245 employs an arrangement replacing the adder 244a shown in FIG. 3 with the third subtractor 245a. The third subtractor 245a subtracts the output signal of the second divider 245e from the reference detection level. Therefore, when the second detection level is "DS2", the following equation is established by the equation (3):

$$DS2=RCS1-\{(SP-RCS1)\times(C-1)/C\times 1/A\times 1/2\} \quad (5)$$

For example, when the start point is 22 [IRE], the reference detection level is 0 [IRE], the maximum gain of the black stretching amplifier 20 is 1.5, the first gain step-size is ¼, the first detection level is about 0.92 [IRE] by the equation (4). The second detection level is −0.92 [IRE] by the equation (5).

Figure 6:
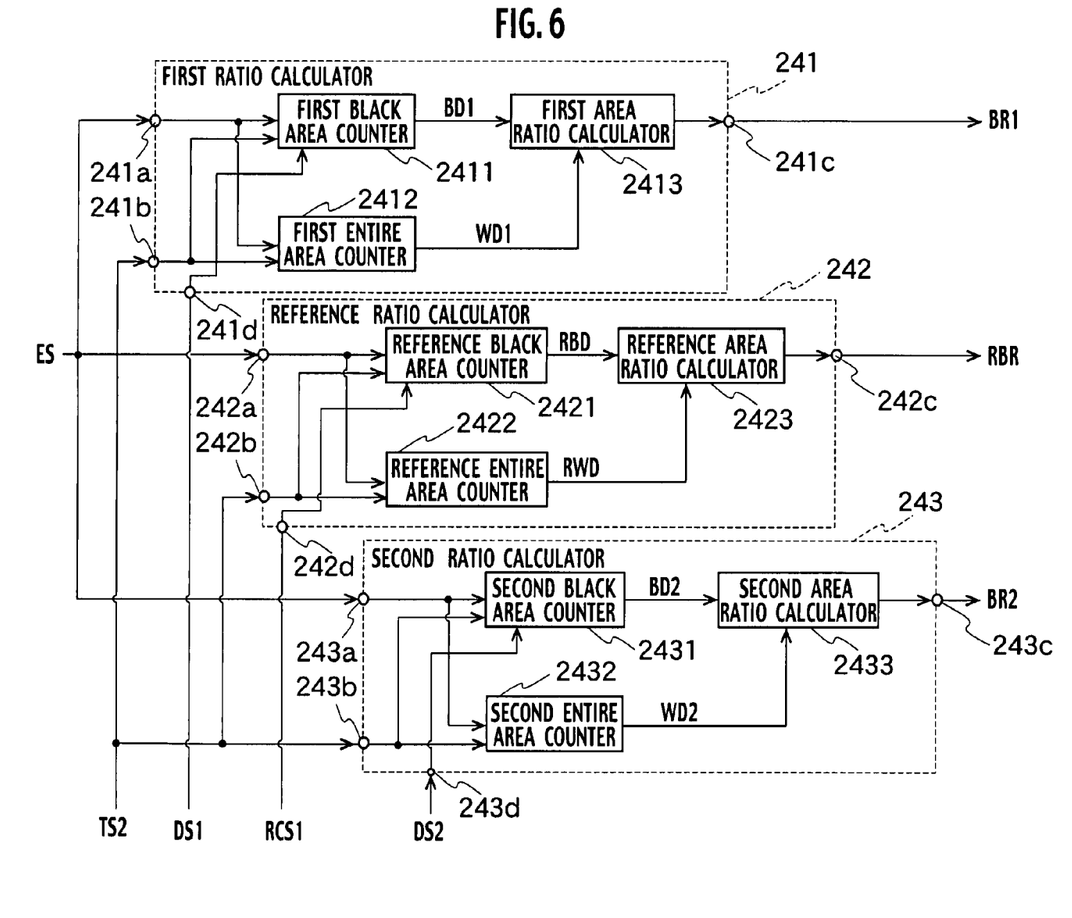
FIG. 6 is a block diagram showing a first ratio calculator, a reference ratio calculator, and a second ratio calculator according to the embodiment of the preset invention.

As shown in FIG. 6, the first ratio calculator 241 shown in FIG. 2 includes a first black stretched signal input terminal 241a, a first timing signal input terminal 241b, a first ratio output terminal 241c, a first detection level signal input terminal 241d, a first black area counter 2411, a first entire area counter 2412, and a first area ratio calculator 2413. The first black area counter 2411 has an input connected to the first black stretched signal input terminal 241a, the first timing signal input terminal 241b, and the first detection level signal input terminal 241d. The first entire area counter 2412 has an input connected to the first black stretched signal input terminal 241a and the first timing signal input terminal 241b. The first area ratio calculator 2413 has an input connected to the first black area counter 2411 and the first entire area counter 2412, and an output connected to the first ratio output terminal 241c.

The first black area counter 2411 counts the signal component of the black stretched signal ES equal to or less than the first detection level in accordance with the second timing signal TS2, and generates a first black area signal BD1. The first entire area counter 2412 counts black stretched signal ES in accordance with the second timing signal TS2, and generates a first entire area signal WD1. The first area ratio calculator 2413 calculates a first ratio by calculating a ratio of the first black area signal BD1 to the first entire area signal WD1.

The reference ratio calculator 242 and the second ratio calculator 243 are arranged the same as the first ratio calculator 241. With respect to the reference ratio calculator 242, the reference black area counter 2421 counts the signal component of the black stretched signal ES equal to or less than the reference detection level in accordance with the second timing signal TS2, and generates the reference black area signal RBD. The reference entire area counter 2422 counts black stretched signal ES in accordance with the second timing signal TS2, and generates a reference entire area signal RWD. The reference area ratio calculator 2423 calculates a reference ratio by calculating a ratio of reference black area signal RBD to the reference entire area signal RWD.

With respect to the second ratio calculator 243, the second black area counter 2431 counts the signal component of the black stretched signal ES equal to or less than the second detection level in accordance with the second timing signal TS2, and generates the second black area signal BD2. The second entire area counter 2432 counts the black stretched signal ES in accordance with the second timing signal TS2, and generates a second entire area signal WD2. The second area ratio calculator 2433 calculates a second ratio by calculating a ratio of the second black area signal BD2 to the second entire area signal WD2. The first entire area counter 2412, the reference entire area counter 2422, and the second entire area counter 2432 may be a common counter.

The comparator 25 shown in FIG. 2 includes a setting ratio input terminal 250, a first comparator 251, a reference comparator 252, and a second comparator 253. The first comparator 251 has one input connected to the first ratio calculator 241, and another input connected to the setting ratio input terminal 250. The reference comparator 252 has one input connected to the reference ratio calculator 242, and another input connected to the setting ratio input terminal 250. The second comparator 253 has one input connected to the second ratio calculator 243, and another input connected to the setting ratio input terminal 250.

The first comparator 251 compares the first ratio signal BR1 with the setting ratio signal RCS2, and generates a first compared signal CP1. The reference comparator 252 compares the reference ratio signal RBR with the setting ratio signal RCS2, and generates a reference-compared signal RCP. The second comparator 253 compares the second ratio signal BR2 with the setting ratio signal RCS2, and generates a second compared signal CP2.

As shown in FIG. 2, the control signal generator 26 includes a gain step controller 262 having an input connected to the first comparator 251 and the second comparator 253, and an increase and decrease controller 261 having an input connected to the reference comparator 252. The increase and decrease controller 261 determines whether the reference ratio is larger than the setting ratio based on the reference compared signal RCP, and generates an increase and decrease control signal SUD. The gain step controller 262 generates a gain step-size control signal GC based on the first compared signal CP1 and the second compared signal CP2.

Next, a method for processing an image according to the embodiment of the present invention will be described referring to FIGS. 1 to 9.

Figure 7:
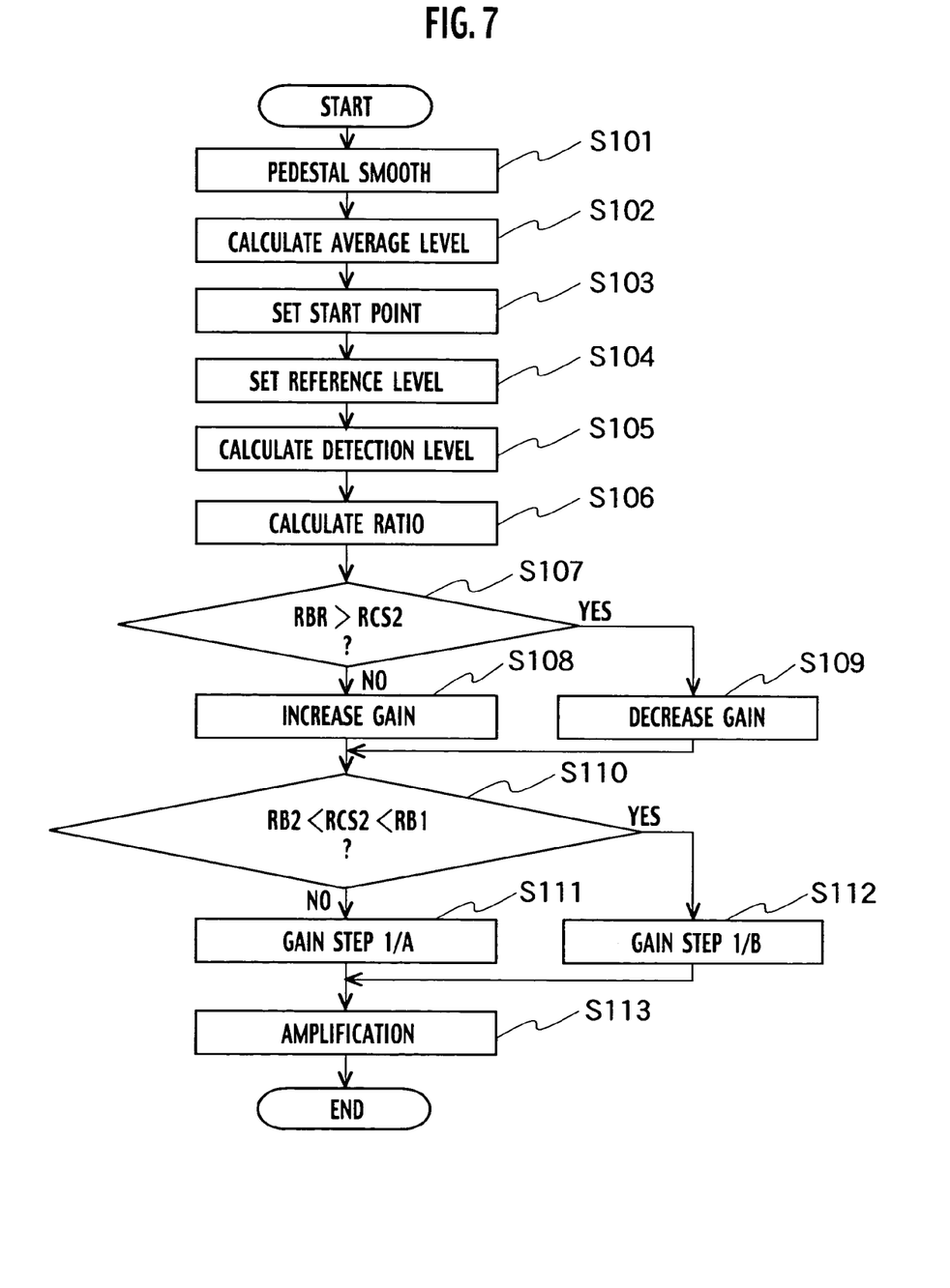
FIG. 7 is a flow chart showing a method for processing an image according to the embodiment of the preset invention.
Figure 8:
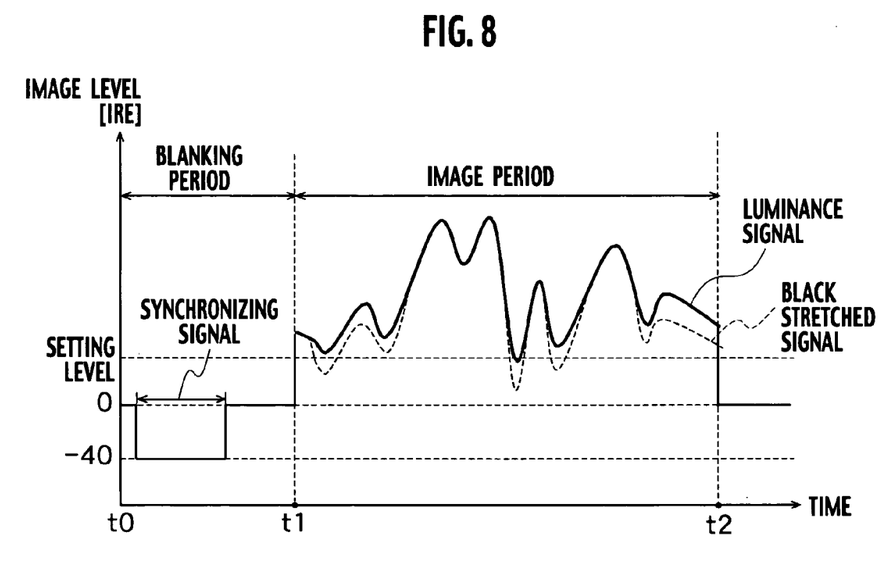
FIG. 8 is a waveform diagram showing an operation of the black stretching circuit according to the embodiment of the preset invention.

(A) In step S101 of shown in FIG. 7, the pedestal smoother 10 shown in FIG. 1 removes the synchronizing signal in the blanking period of time t1 to t2 shown in FIG. 8, and fixes the signal level in the blanking period to the pedestal level. In step S102, the average level calculator 32a calculates the APL of the black stretched signal ES. The determination circuit 31a supplies the start point signal SP to the black stretching amplifier 20 based on the image control signal AS.

Figure 9:
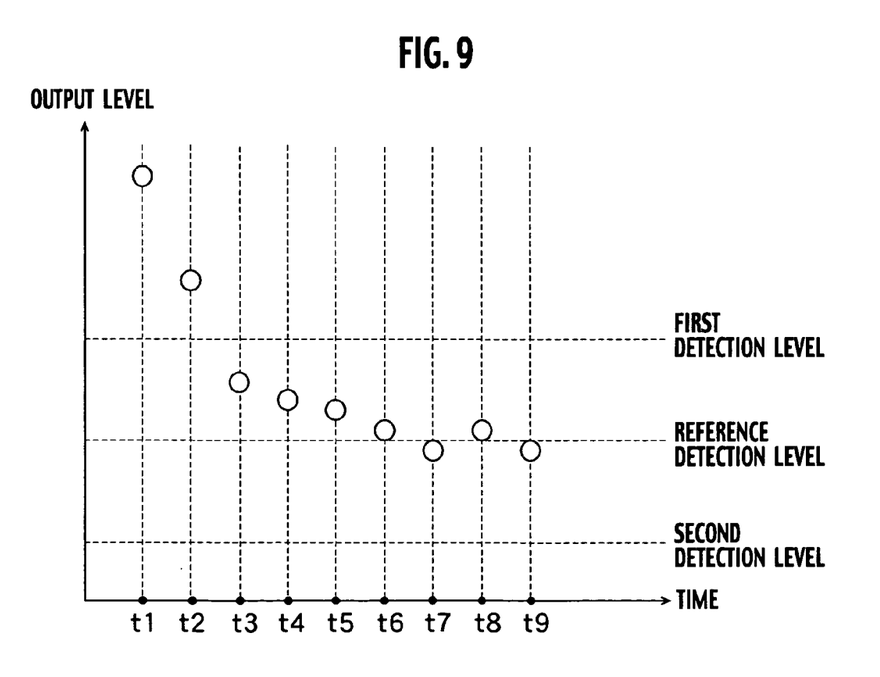
FIG. 9 is a schematic diagram showing an operation of the stretching circuit according to the embodiment of the preset invention.

(B) In step S104, the detection level controller 271 supplies the reference detection level signal RCS1 to the ratio calculator 24. In step S105, the first level calculator 244 shown in FIG. 2 generates the first detection level signal DS1 based on the reference detection level signal RCS1 and the start point signal SP as shown in equation (4). The second detection level signal calculate circuit 245 generates the second detection level signal DS2 based on the reference detection level signal RCS1 and the start point signal SP as shown in equation (5). As a result, the reference detection level, the first detection level, and the second detection level are set to the ratio calculator 24 as shown in FIG. 9.

(C) In step S106, the first ratio calculator 241 shown in FIG. 2 calculates the black color ratio in accordance with the first detection level signal DS1, and generates the first ratio signal BR1. The reference ratio calculator 242 calculates the black color ratio of the black stretched signal ES in accordance with the reference detection level signal RDS, and generates the reference ratio signal RBR. The second ratio calculator 243 calculates the black color ratio of the black stretched signal ES in accordance with the second detection level signal DS2, and generates second ratio signal BR2.

(D) In step S107, the increase and decrease controller 261 shown in FIG. 2 determines whether the reference ratio is larger than the setting ratio based on the reference-compared signal RCP. When it is determined that the reference ratio is smaller than the setting ratio, the procedure advances to step S108. When it is determined that the reference ratio is larger than the setting ratio, the procedure advances to step S109.

(E) In step S108, the increase and decrease controller 261 sets the gain of the black stretching amplifier 20 shown in FIG. 1 in the increase direction by use of the increase and decrease control signal SUD. On the other hand, in step S109, the increase and decrease controller 261 sets the gain of the black stretching amplifier 20 in decrease direction by use of the increase and decrease control signal SUD.

(F) In step S110, the gain step controller 262 shown in FIG. 2 sets the gain step-size of the black stretching amplifier 20 based on the first compared signal CP1 and the second compared signal CP2. When it is determined that the first ratio is larger than the setting ratio, and the second ratio is smaller than the setting ratio, the procedure advances to step S112. When it is determined that the first ratio is smaller than the setting ratio, or the second ratio is larger than the setting ratio, the procedure advances to step S111.

(G) In step S112, the gain step controller 262 sets the gain step-size of the black stretching amplifier 20 to 1/B, i.e., the second gain step-size. On the other hand, in step S111, the gain step controller 262 sets the gain step-size of the black stretching amplifier 20 to 1/A, i.e., the first gain step-size. In step S113, the black stretching amplifier 20 provides the black stretching to the smoothed signal SS by use of the established increase and decrease directions and the established gain step-size. During the period of time t1 to t2 shown in FIG. 8, the black stretching amplifier 20 executes black stretching to the image period of the luminance signal YS.

As described above, according to the embodiment of the preset invention, it is possible to set two gain step-sizes to the black stretching amplifier 20 provided as a digital circuit. As shown in FIG. 9, the first gain step-size is selected as the gain step-size of the black stretching amplifier 20 when the difference of the black level ratio and the setting ratio is large. The second gain step-size, having a smaller step-size than the first step-size, is selected as the gain step-size of the black stretching amplifier 20 when the black level ratio is near the setting ratio. As a result, it is possible to reduce the time necessary to reach near the setting ratio. Moreover, it is possible to prevent flicker of the display.

Figure 10:
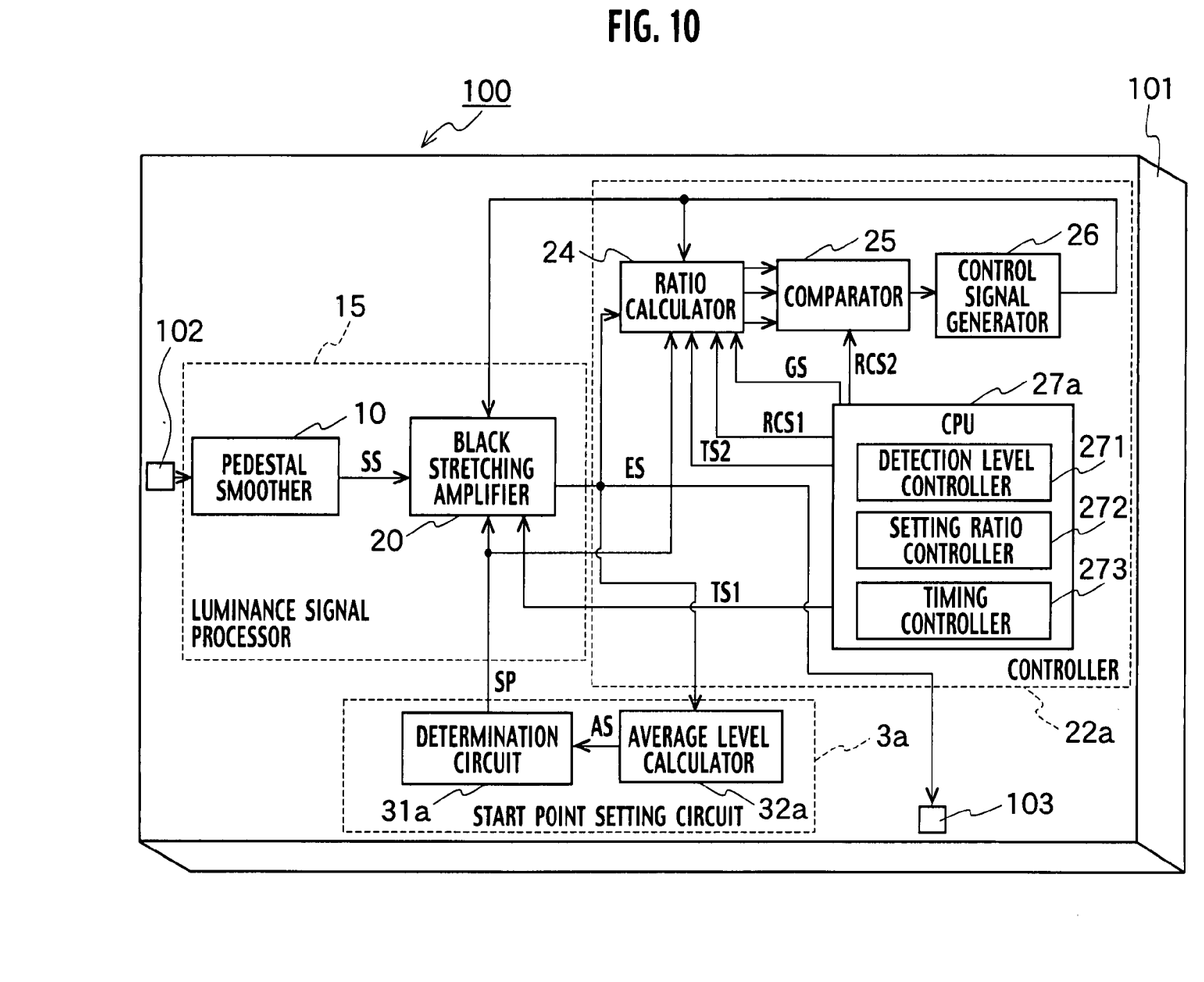
FIG. 10 is a schematic diagram showing a semiconductor integrated circuit according to the embodiment of the preset invention.

As shown in FIG. 10, the black stretching circuit 1a shown in FIG. 1 can be monolithically integrated onto a single semiconductor chip 101, and a semiconductor integrated circuit 100 can be formed. In the example shown in FIG. 10, bonding pads 102 and 103 are formed on the semiconductor chip 101. The bonding pad 102 is an internal terminal for transmitting the luminance signal YS generated by the image signal generator 84 to the pedestal smoother 10. The bonding pad 103 is an internal terminal for transmitting the black stretched signal ES generated by the black stretching amplifier 20 to the matrix circuit 4. Since the black stretching circuit 1a is formed as a digital circuit, it is possible to use a digital complementary metal-oxide-semiconductor (CMOS) process. Therefore, it is possible to reduce the area of the semiconductor integrated circuit 100, compared with a semiconductor integrated circuit formed as an analog circuit.

Figure 11:
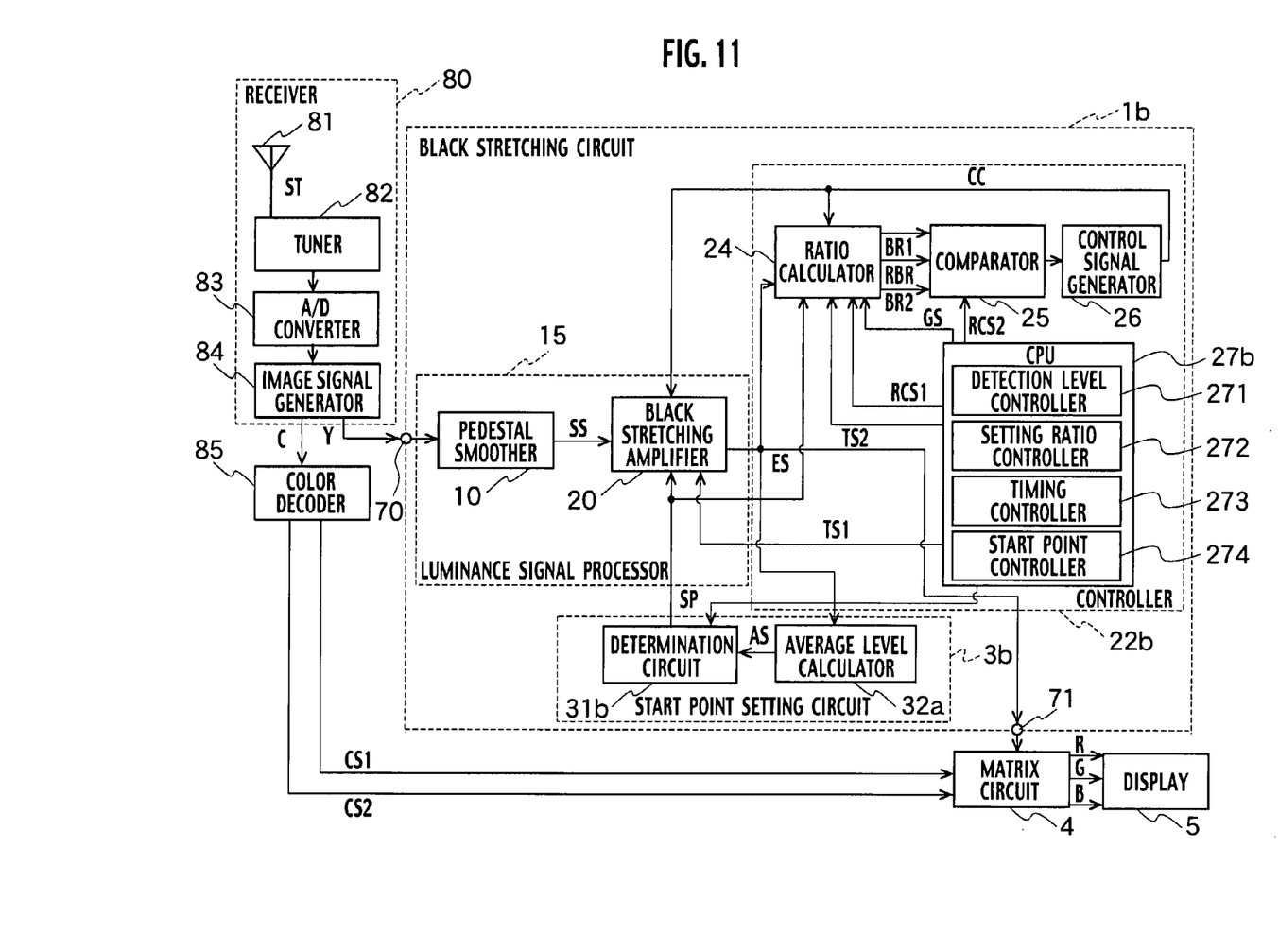
FIG. 11 is a block diagram showing an example of an image processor according to a first modification of the embodiment of the preset invention.

As shown in FIG. 11, the CPU 27b may further include a start point controller 274 configured to control the start point as an image processor according to a first modification of the embodiment. As a result, it is possible to set the start point freely.

Figure 12:
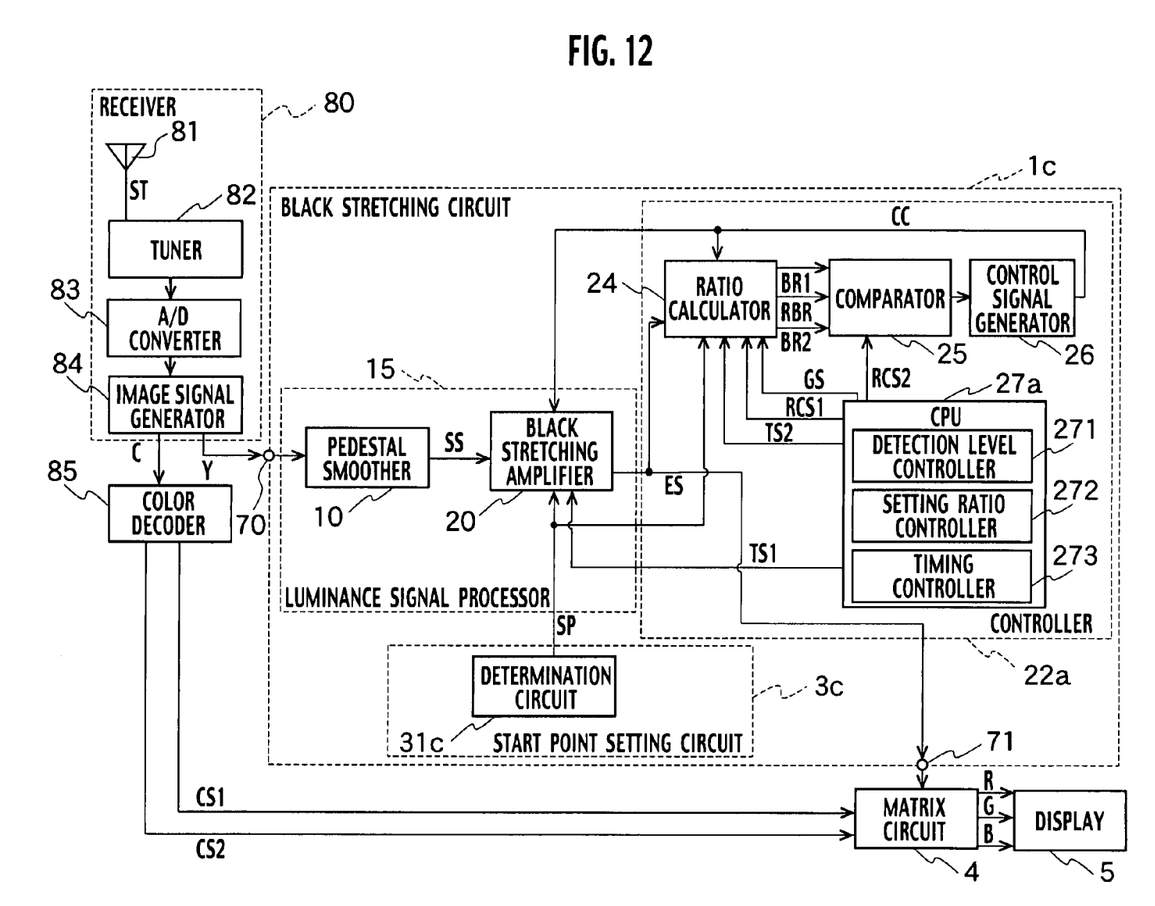
FIG. 12 is a block diagram showing an example of an image processor according to a second modification of the embodiment of the preset invention.

As shown in FIG. 12, an arrangement fixing the start point may be employed as an image processor according to a second modification of the embodiment.

(Other Embodiments)

Various modifications will become possible for those skilled in the art after receiving the teachings of the present disclosure without departing from the scope thereof.

Figure 13:
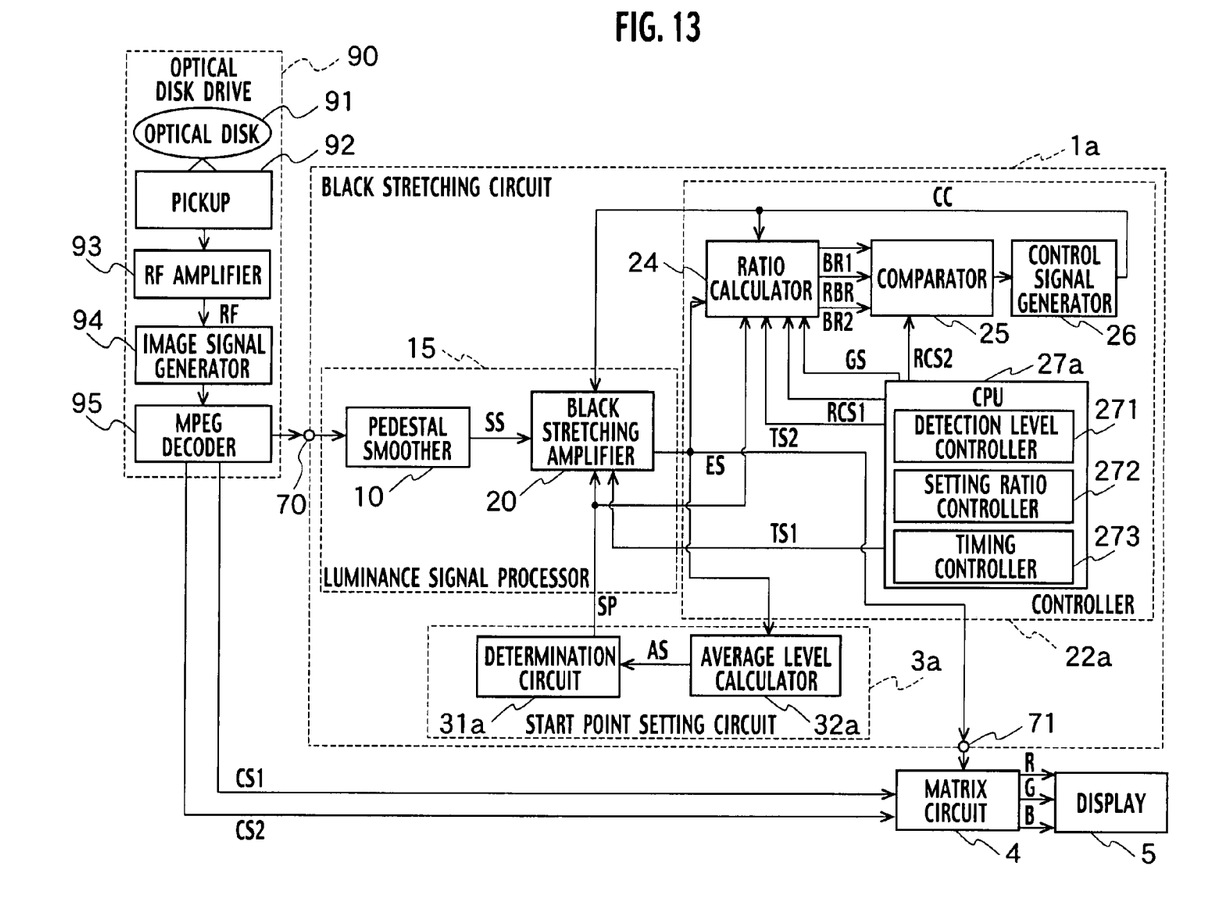
FIG. 13 is a block diagram showing an example of an image processor according to other embodiments of the embodiment of the preset invention.

As shown in FIG. 13, an optical disk drive 90 may be connected to the luminance signal processor 15 instead of the receiver 80 shown in FIG. 1. In this case, it is possible to emit the color decoder 85 shown in FIG. 1.

For example, the optical disk drive 90 includes an optical disk 91, a pickup 92, a radio frequency (RF) amplifier 93, an image signal generator 94 connected to the RF amplifier 93, and a moving picture experts group (MPEG) decoder 95 connected to the image signal generator 94. Moreover, the image processor according to the embodiment of the present invention can be applied to various apparatuses or systems without being limited to a television set.

Although the aforementioned embodiment have been described by way of example in which the CPUs 27a and 27b generate the maximum gain signal GS, the first operator 244c shown in FIG. 3 and the second operator 245c shown in FIG. 4 may store data of the maximum gain of black stretching amplifier 20 previously.

The aforementioned embodiment has been described by way of example in which the black stretched signal ES is directly supplied to the matrix circuit 4. However, a contour enhancement circuit configured to execute a contour enhancement processing to the black stretched signal ES may be further included.

The aforementioned embodiment has been described by way of example in which three black color ratios, i.e., the reference ratio, the first ratio, and the second ratio are used. However, black color ratios of more than three patterns may be used. In this case, it is possible to set the gain step-size of the black stretching amplifier 20 to more than two patterns.

What is claimed is:

1. An image processor comprising:
a luminance signal processor configured to execute an amplification by utilizing a gain set by a plurality of gain step-sizes including a first gain step-size and a second gain step-size less than the first gain step-size, to an image signal component which is equal to or less than a fixed luminance level in an image signal, so that a ratio that a luminance level of the image signal component is equal to or less than a reference detection level can reach a setting ratio; and
a control circuit configured to control increase and decrease of the gain utilized by the amplification and the gain step-sizes based on a ratio that a luminance level of the image signal component amplified by the luminance signal processor is equal to or less than the reference detection level, a ratio that the luminance level of the image signal component amplified by the luminance signal processor is equal to or less than a first detection level greater than the reference detection level, and a ratio that luminance level of the image signal component amplified by the luminance signal processor is equal to or less than a second detection level less than the reference detection level.

2. The image processor of claim 1, wherein the control circuit controls the increase and the decrease of the gain utilized by the amplification in accordance with a comparison of the ratio that a luminance level of the image signal component amplified by the luminance signal processor is equal to or less than the reference detection level and the setting ratio.

3. The image processor of claim 1, wherein the control circuit selects the first gain step-size when the ratio that the luminance level of the image signal component amplified by the luminance signal processor is equal to or less than the first detection level is smaller than the setting ratio, or the ratio that luminance level of the image signal component amplified by the luminance signal processor is equal to or less than the second detection level is larger than the setting ratio.

4. The image processor of claim 1, wherein the control circuit selects the second gain step-size when the ratio that the luminance level of the image signal component amplified by the luminance signal processor is equal to or less than the first detection level is larger than the setting ratio, and the ratio that luminance level of the image signal component amplified by the luminance signal processor is equal to or less than the second detection level is larger than the setting ratio is smaller than the setting ratio.

5. The image processor of claim 1, wherein the first detection level is determined by:

$$DS1 = RCS1 + \{(SP - RCS1) \times (C-1)/C \times 1/A \times \frac{1}{2}\}$$

and the second detection level is determined by:

$$DS2 = RCS1 - \{(SP - RCS1) \times (C-1)/C \times 1/A \times \frac{1}{2}\}$$

where, SP is the fixed luminance level which is an upper limit of a luminance level of the image signal component, RCS1 is the reference detection level, C is a maximum gain of the luminance signal processor, and C/A is the first gain step-size.

6. The image processor of claim 1, wherein the control circuit comprises:

a reference ratio calculator configured to detect the ratio that the luminance level of the image signal component amplified by the luminance signal processor is equal to or less than the reference detection level;

a first ratio calculator configured to detect the ratio that the luminance level of the image signal component amplified by the luminance signal processor is equal to or less than the first detection level; and a second ratio calculator configured to detect the ratio that luminance level of the image signal component amplified by the luminance signal processor is equal to or less than the second detection level.

7. The image processor of claim 6, wherein the control circuit further comprises:

a reference comparator configured to compare the ratio detected by the reference ratio calculator with the setting ratio;

a first comparator configured to compare the ratio detected by the first ratio calculator with the setting ratio; and a second comparator configured to compare the ratio detected by the second ratio calculator with the setting ratio.

8. The image processor of claim 7, wherein the control circuit further comprises a control signal generator configured to generate a control signal for controlling the increase and the decrease of the gain utilized by the amplification and the gain step-sizes based on each comparison result of the reference comparator, the first comparator, and the second comparator.

9. The image processor of claim 1, wherein the fixed luminance level is a black stretching start level, and the reference detection level is a black level.

10. The image processor of claim 8, wherein the control signal generator sets the gain utilized by the amplification in an increase direction when the ratio that the luminance level of the image signal component amplified by the luminance signal processor is smaller than the setting ratio, and sets the gain utilized by the amplification in a decrease direction when the ratio that the luminance level of the image signal component amplified by the luminance signal processor is larger than the setting ratio.

11. The image processor of claim 8, wherein the control signal generator generates the control signal for selecting the first gain step-size when the ratio that the luminance level of the image signal component amplified by the luminance signal processor is equal to or less than the first detection level is smaller than the setting ratio, or the ratio that luminance level of the image signal component amplified by the luminance signal processor is equal to or less than the second detection level is larger than the setting ratio.

12. The image processor of claim 8, wherein the control signal generator generates the signal for selecting the second gain step-size when the ratio that the luminance level of the image signal component amplified by the luminance signal processor is equal to or less than the first detection level is larger than the setting ratio, and the ratio that luminance level of the image signal component amplified by the luminance signal processor is equal to or less than the second detection level is larger than the setting ratio is smaller than the setting ratio.

13. A semiconductor integrated circuit comprising:

a luminance signal processor integrated on a semiconductor chip and configured to execute an amplification by utilizing a gain set by a plurality of gain step-sizes including a first gain step-size and a second gain step-size less than the first gain step-size, to an image signal component which is equal to or less than a fixed luminance level in an image signal, so that a ratio that a luminance level of the image signal component is equal to or less than a reference detection level can reach a setting ratio; and a control circuit integrated on the semiconductor chip and configured to control increase and decrease of the gain utilized by the amplification and the gain step-sizes based on a ratio that a luminance level of the image signal component amplified by the luminance signal processor is equal to or less than the reference detection level, a ratio that the luminance level of the image signal component amplified by the luminance signal processor is equal to or less than a first detection level greater than the reference detection level, and a ratio that luminance level of the image signal component amplified by the luminance signal processor is equal to or less than a second detection level less than the reference detection level.

14. The semiconductor integrated circuit of claim 13, wherein the control circuit controls the increase and the decrease of the gain utilized by the amplification in accordance with a comparison of the ratio that a luminance level of the image signal component amplified by the luminance signal processor is equal to or less than the reference detection level and the setting ratio.

15. The semiconductor integrated circuit of claim 13, wherein the control circuit selects the first gain step-size when the ratio that the luminance level of the image signal component amplified by the luminance signal processor is equal to or less than the first detection level is smaller than the setting ratio, or the ratio that luminance level of the image signal component amplified by the luminance signal processor is equal to or less than the second detection level is larger than the setting ratio.

16. The semiconductor integrated circuit of claim 13, wherein the control circuit selects the second gain step-size when the ratio that the luminance level of the image signal component amplified by the luminance signal processor is equal to or less than the first detection level is larger than the setting ratio, and the ratio that luminance level of the image signal component amplified by the luminance signal processor is equal to or less than the second detection level is larger than the setting ratio is smaller than the setting ratio.

17. The semiconductor integrated circuit of claim 13, wherein the first detection level is determined by:

$$DS1 = RCS1 + \{(SP-RCS1) \times (C-1)/C \times 1/A \times \frac{1}{2}\}$$

and the second detection level is determined by:

$$DS2 = RCS1 - \{(SP-RCS1) \times (C-1)/C \times 1/A \times \frac{1}{2}\}$$

where, SP is the fixed luminance level which is an upper limit of a luminance level of the image signal component, RCS1 is the reference detection level, C is a maximum gain of the luminance signal processor, and C/A is the first gain step-size.

18. The semiconductor integrated circuit of claim 13, wherein the control circuit comprises:
 a reference ratio calculator configured to detect the ratio that the luminance level of the image signal component amplified by the luminance signal processor is equal to or less than the reference detection level;
 a first ratio calculator configured to detect the ratio that the luminance level of the image signal component amplified by the luminance signal processor is equal to or less than the first detection level; and
 a second ratio calculator configured to detect the ratio that luminance level of the image signal component amplified by the luminance signal processor is equal to or less than the second detection level.

19. The semiconductor integrated circuit of claim 13, wherein the control circuit further comprises:
 a reference comparator configured to compare the ratio detected by the reference ratio calculator with the setting ratio;
 a first comparator configured to compare the ratio detected by the first ratio calculator with the setting ratio;
 a second comparator configured to compare the ratio detected by the second ratio calculator with the setting ratio; and
 a control signal generator configured to generate a control signal for controlling the increase and the decrease of the gain utilized by the amplification and the gain step-sizes based on each comparison result of the reference comparator, the first comparator, and the second comparator.

20. A method for processing an image, comprising:
 executing an amplification by utilizing a gain set by a plurality of gain step-sizes including a first gain step-size and a second gain step-size less than the first gain step-size, to an image signal component which is equal to or less than a fixed luminance level in an image signal, so that a ratio that a luminance level of the image signal component is equal to or less than a reference detection level can reach a setting ratio; and
 controlling increase and decrease of the gain utilized by the amplification and the gain step-sizes based on a ratio that a luminance level of the image signal component amplified by the luminance signal processor is equal to or less than the reference detection level, a ratio that the luminance level of the image signal component amplified by the luminance signal processor is equal to or less than a first detection level greater than the reference detection level, and a ratio that luminance level of the image signal component amplified by the luminance signal processor is equal to or less than a second detection level less than the reference detection level.

* * * * *